No. 830,306. PATENTED SEPT. 4, 1906.
F. C. DAMM.
ELECTRIC LIGHT AND POWER CONTROLLER.
APPLICATION FILED SEPT. 18, 1905.
2 SHEETS—SHEET 1.
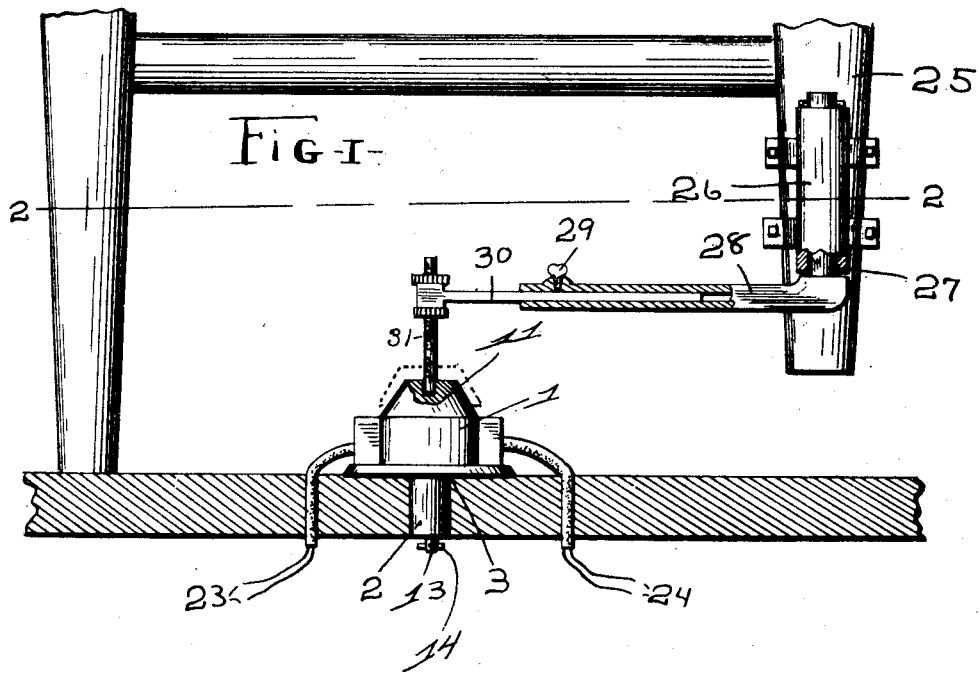
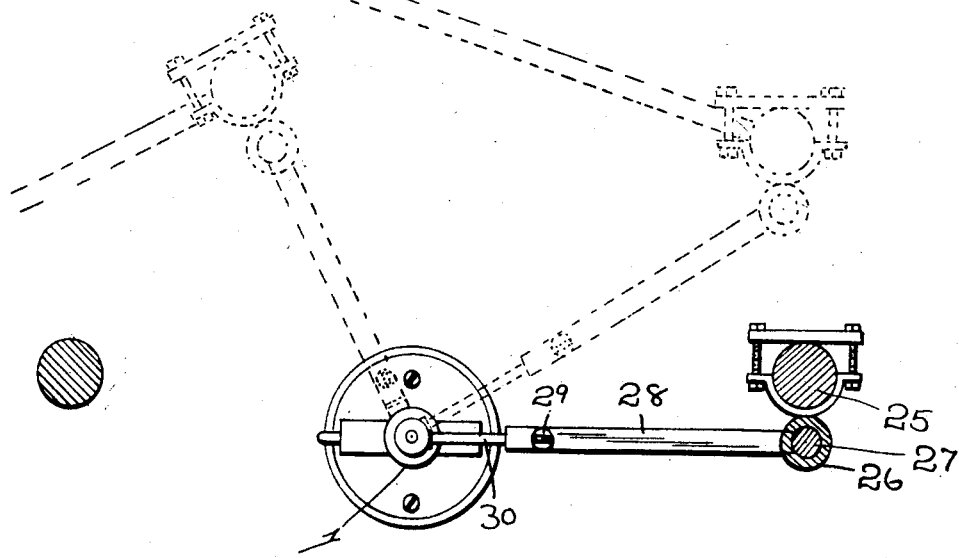
WITNESSES
INVENTOR
F. C. Damm.

No. 830,306. PATENTED SEPT. 4, 1906.
F. C. DAMM.
ELECTRIC LIGHT AND POWER CONTROLLER.
APPLICATION FILED SEPT. 18, 1905.
2 SHEETS—SHEET 2.
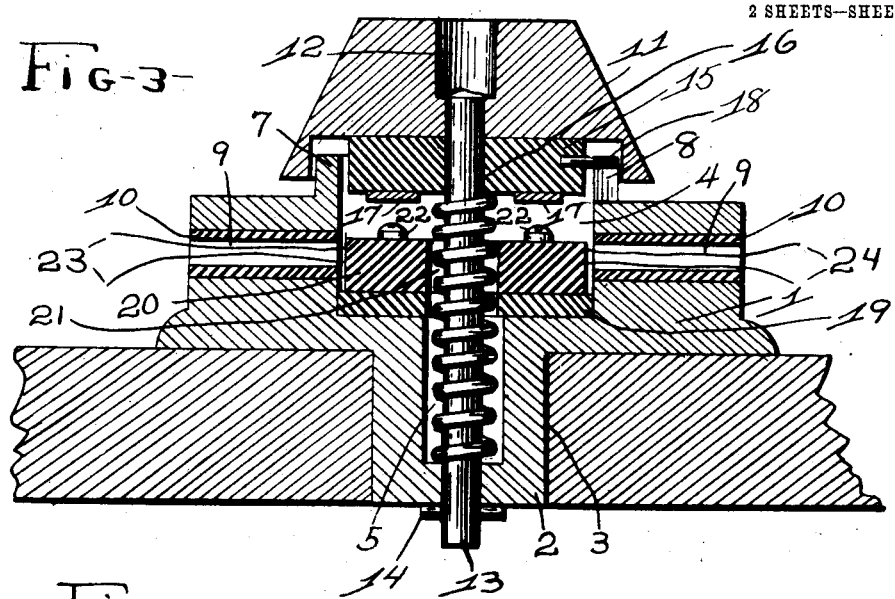
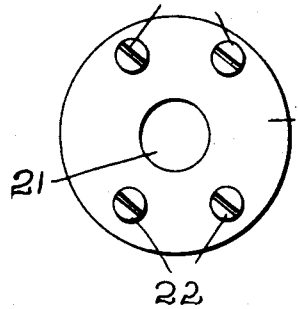
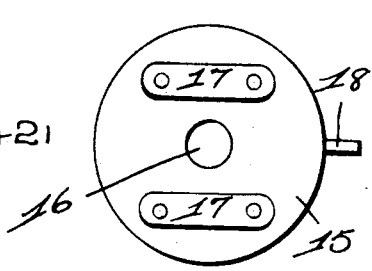
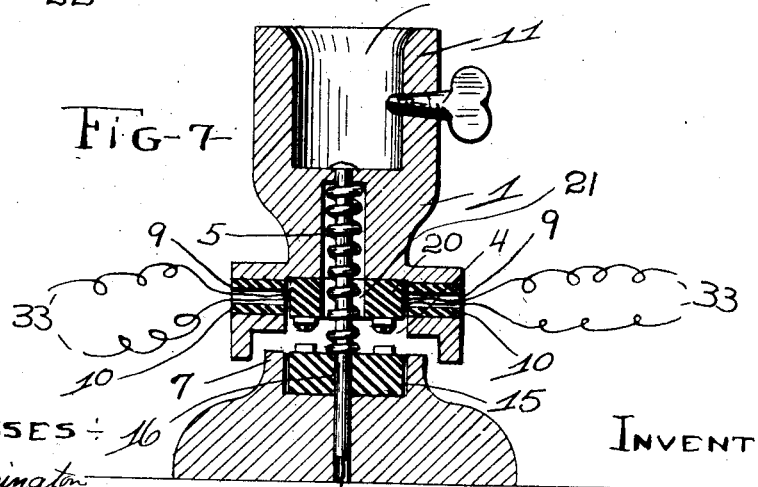
WITNESSES: INVENTOR:
E. M. Harrington F. C. Damm.
M. P. Smith By Higdon & Longan
ATTYS

UNITED STATES PATENT OFFICE.

FREDRICH C. DAMM, OF ST. LOUIS, MISSOURI.

ELECTRIC LIGHT AND POWER CONTROLLER.

No. 830,306.  Specification of Letters Patent.  Patented Sept. 4, 1906.

Application filed September 18, 1905. Serial No. 278,869.

*To all whom it may concern:*

Be it known that I, FREDRICH C. DAMM, a citizen of the United States, and a resident of St. Louis, Missouri, have invented certain new and useful Improvements in Electric Light and Power Controllers, of which the following is a specification containing a full, clear, and exact description, reference being had to the accompanying drawings, forming a part thereof.

My invention relates generally to an electric light and power controller, and particularly to a controller that is adapted to be operated to close an electric circuit by a weight.

In certain machines—such as linotypes, power sewing-machines, and similar devices—it is desirable that the electric power to said machines be cut off when the operator leaves the machine for any reason. Where an ordinary hand-switch is made use of in the electrical connections to these machines, it very frequently happens that the operator fails to throws the switch when leaving the machine, and thus the power to the motors of the machines is wasted during the time the operator is absent from the machine.

The object of my invention is to provide a simple, inexpensive controller wherein an electrical contact is made and maintained by the weight of the machine operator while seated in a chair and which contact is broken as soon as the operator rises from the chair.

To the above purposes my invention consists in certain novel features of construction and arrangement of parts, that will hereinafter be more fully set forth, pointed out in the claims, and illustrated in the accompanying drawings, in which—

Figure 1 is a sectional view of a portion of a floor, showing my improved controller in elevation and also showing the connections between the controller and the chair. Fig. 2 is a horizontal section taken on the line 2 2 of Fig. 1. Fig. 3 is an enlarged vertical section taken through the center of my improved controller. Fig. 4 is a plan view of the disk of insulation, carrying contact-screws, to which the electric wires are secured. Fig. 5 is a plan view of the under side of a disk of insulation and carrying contact-plates that engage with the screw-heads arranged in the opposite disk. Fig. 6 is a horizontal section through the center of the disk seen in Fig. 4. Fig. 7 is a vertical section taken through the center of a modified form of my improved controller.

Referring by numerals to the accompanying drawings, 1 indicates the body of my improved controller, which is in the form of a circular block provided with a depending stem 2, that enters a suitably-formed aperture 3, that is located in the floor at a suitable point beneath the chair of the operator of a machine that is driven by electric power. Formed in the center of this body 1 is a circular recess 4, and extending downwardly therefrom into the stem 2 is a circular recess 5. Formed integral with the top of the block 1 around the recess 4 is an upwardly-projecting annular flange 7, in one side of which is formed a vertical slot 8. Formed through the wall of the block 1 on opposite sides thereof are the apertures 9, in which are arranged insulating-tubes 10.

11 indicates a circular block in the center of the top of which is formed an aperture 12. Fixed to this block 11 and extending downwardly from the center thereof is a post 13, that extends through the centers of the recesses 4 and 5 and through the bottom of the stem 2. Passing through the lower end of this post below the stem is a pin 14. Positioned against the under side of the block 11 is a disk 15 of insulation, provided with an aperture 16 to receive the post 13, and secured to the under side of this disk on opposite sides of the aperture is a pair of contact-plates 17. Seated in the side of this disk is a pin 18, that is arranged in the slot 8, and thus forms a guide to maintain the disk in proper position and to prevent its rotation.

Located in the bottom of the recess 4 is a disk 19 of insulation, provided with a centrally-arranged aperture to receive the post 13. Located upon this disk 19 is a second disk 20 of insulation, in the center of which is formed an aperture 21, through which passes the post 13. Passing downwardly through the disk 20 on opposite sides thereof are the two pairs of screws 22, and to one pair of screws are secured the ends of wires 23 of the electric-power circuit, and to the remaining pair of screws are secured the ends of wires 24 of the electric-light circuit, the lights of which are adjacent the machine, controlled by the switch. Located upon the post 13 between the under side of the disk 15 and the lower end of the stem 2 is an expansive coil-spring 24ª, which normally retains the block 11 and disk 15 in their elevated positions. One leg 25 of the chair in which the operator is seated, adjacent the machine, is made shorter than the remaining legs, and detachably and adjustably secured to this short leg is a vertically-arranged cylinder 26. Arranged for rotation in this cylinder is a shaft 27, carrying at its lower end a horizontally-arranged sleeve 28. Adjustably held in this sleeve by means of a set-screw 29 is a rod 30, in the outer end of which is adjustably arranged a vertically-positioned pin 31, the lower end of which is normally positioned in the recess 12 in the top of the block 11.

Whenever a person is seated in the chair above the controlling device, the weight of the person will depress the block 11, compressing the spring $24^a$ and moving the disk 15 and contact-plates 17, carried thereby, downwardly until said plates rest upon the heads of the pairs of screws 22. This closes both the power and light circuits, and the machine is thus maintained in an operative condition, and the electric lamps adjacent said machine are lighted as long as the operator remains seated on the chair. By locating the shaft 27 in the cylinder 26 and providing for adjustment between the sleeve 28 and the rod 30 the chair-leg can be moved to and from and to various points around the controlling device, thus allowing the operator to sit in various position relative the machine.

In the modification shown in Fig. 7 the disks 15 and 20 are reversed in position and the block on top of the device is provided with an enlarged recess, such as 32, which receives the lower end of a chair-leg. In this construction the stem 2 is done away with in order that the device can be moved around or shifted with the chair, and in this construction the electric wires leading to the device are provided with suitable coils, such as 33, which allow the device to be shifted about upon the floor.

A switch and controlling device of my improved construction is simple, inexpensive, easily applied for use, and is especially applicable for all machines where electricity is used as a motive power or for the lights.

I claim—

1. In a device of the class described, the combination with the electric light and power circuits of an electrically operated and lighted machine of fixed contact-points in each of said circuits, yielding contact-points arranged adjacent the fixed contact-points, and adjustable connections from the yielding contact-points to the leg of the chair occupied by the operator of the machine; substantially as specified.

2. The combination with an electric circuit of fixed contact-points in said circuit, yielding contact-points arranged adjacent the fixed contact-points, a chair, and adjustable connections from the yielding contact-points to the leg of the chair; substantially as specified.

3. The combination with an electric circuit, of fixed contact-points in said circuit, yielding contact-points arranged adjacent the fixed contact-points, a chair, and flexible connections from the yielding contact-points to the chair; substantially as specified.

In testimony whereof I have signed my name to this specification in presence of two subscribing witnesses.

FREDRICH C. DAMM.

Witnesses:
 M. P. SMITH,
 JOHN C. HIGDON.